G. YOUNG.
BOTTLE TRANSFERRING APPARATUS.
APPLICATION FILED FEB. 24, 1919.
1,358,913.
Patented Nov. 16, 1920.
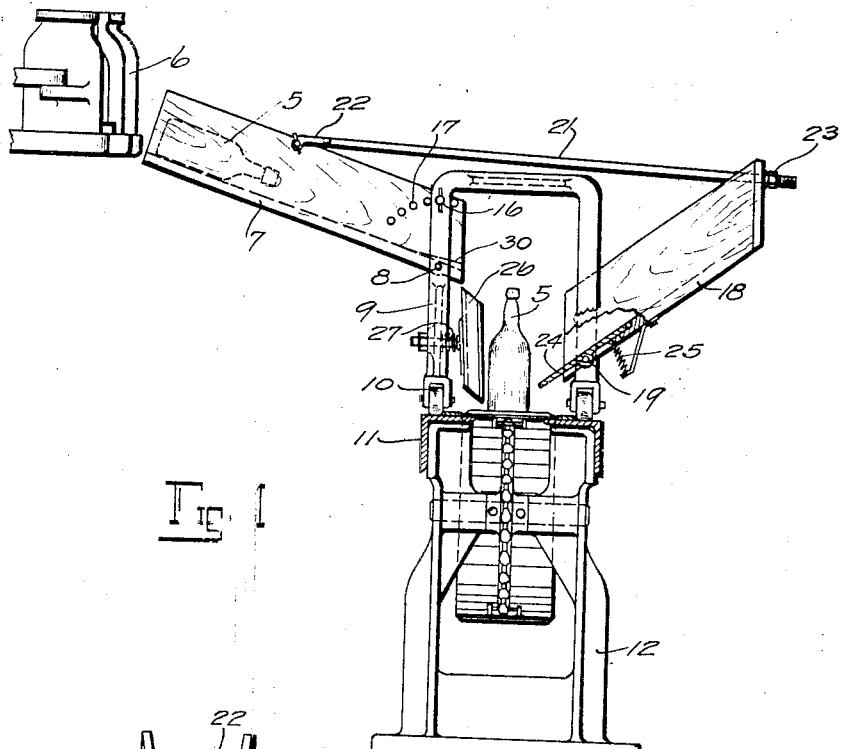
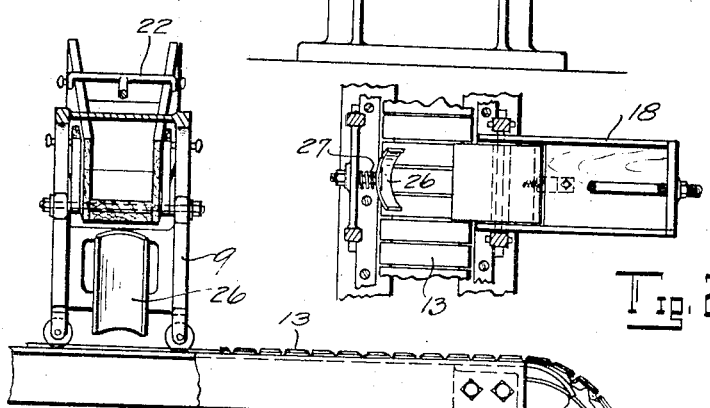
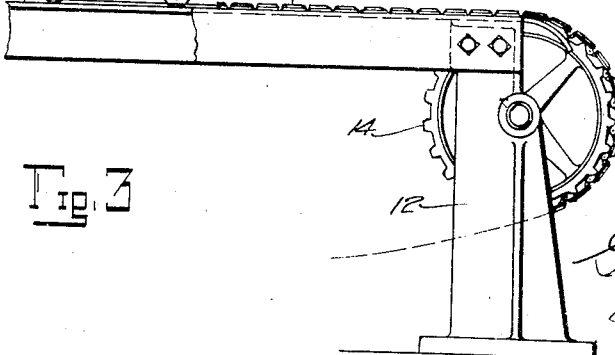
INVENTOR

UNITED STATES PATENT OFFICE.

GLENN YOUNG, OF COSHOCTON, OHIO, ASSIGNOR TO THE OWENS BOTTLE MACHINE COMPANY, OF TOLEDO, OHIO, A CORPORATION OF OHIO.

BOTTLE-TRANSFERRING APPARATUS.

1,358,913.  Specification of Letters Patent.  Patented Nov. 16, 1920.

Application filed February 24, 1919. Serial No. 278,793.

*To all whom it may concern:*

Be it known that I, GLENN YOUNG, a citizen of the United States, residing at Coshocton, in the county of Coshocton and State of Ohio, have invented new and useful Improvements in Bottle-Transferring Apparatus, of which the following is a specification.

My invention relates to means for handling bottles or other ware and is especially adapted for transferring bottles and the like from a forming machine to a conveyer by which the ware is carried to the annealing leer. In bottle blowing machines it is customary to discharge the bottles neck end downward onto a chute or other means, by which they are conveyed from the machine. The bottles are then placed in an upright position on the conveyer for carrying them to the leer.

An object of the present invention is to provide a simple and practical transfer device for receiving the bottles as they are discharged from the finishing molds and automatically transferring and placing them in an upright position on the conveyer.

A further object of the invention is to provide a simple and reliable mechanism in which the action of gravity is utilized to transfer the bottles, reverse them and place them in an upright position.

Other objects of the invention will appear hereinafter.

In the accompanying drawings:

Figure 1 is a part sectional elevation of a bottle transferring apparatus embodying the principles of my invention.

Fig. 2 is a plan view of a portion of said mechanism.

Fig. 3 is a sectional elevation looking in a direction at right angles to that of Fig. 1.

The bottles 5 are discharged *seriatim* from the finishing molds 6 of a bottle blowing machine and drop neck end first on an inclined trough or chute 7. This trough is connected by a pivot 8 to a U shaped frame 9 having rollers 10 to run on tracks formed by angle irons 11, whereby said frame may be moved to any position along the tracks, depending on the position of the blowing machine. The angle bars 11 are mounted on standards 12, thereby forming a frame work on which an endless conveyer 13 is supported. The conveyer may serve to carry the bottles or other ware to an annealing leer. The conveyer runs on a sprocket wheel 14 mounted on the standards 12.

The chute 7 is held at any desired inclination by a pin 16 adapted to engage any one of a series of openings 17 in the trough. A second chute 18 is connected by a pivot 19 to the opposite side of the frame 9 from the chute 7, the chute 18 being in a lower position than the chute 7. A brace rod 21 is formed at one end with a yoke 22 by which the rod is connected to the chute 7, the other end of the rod being adjustably connected to the upper end of the chute 18. A nut 23 adjustable on the threaded end of the rod holds the chute 18 at any desired angle of adjustment. The lower end of the chute 18 may comprise a bottom plate 24 hinged at 19 and tiltable vertically under the weight of a bottle, against the tension of a returning spring 25. An upright guard plate 26 is placed opposite the lower end of the chute 18 and is adapted to yield against the tension of a spring 27 when struck by a bottle, thereby serving also as a spring buffer.

In operation, the bottles are discharged one at a time onto the chute 7, neck end foremost. The bottle slides down this chute by gravity and gathers sufficient momentum to carry it across the space between the chutes. It is thus discharged onto the chute 18 with the neck end of the bottle uppermost. The lower end of the chute 7 may have its floor deflected upwardly more or less, as indicated at 30, to give an upward turn to the bottle as it jumps across to the chute 18. The bottle now slides downward by gravity off the chute 18 onto the conveyer 13. As the bottle slides over the hinged section 24 the latter tilts, thus assisting in placing the bottle upright on the conveyer. The plate 26 may serve as a buffer for arresting the bottle and also steadies the bottle as it drops onto the conveyer. The latter is moving continuously, so that the bottle when placed thereon is immediately moved away, making room for the succeeding bottle.

What I claim is:

1. The combination with a horizontally moving conveyer, of an inclined chute to which bottles are delivered neck end downward and down which the bottles slide by gravity, and means to direct the bottles to an upright position on the conveyer, the movement of the bottles down the chute and to said upright position being caused by and dependent solely on the action of gravity on the bottles.

2. The combination with a horizontally moving conveyer, of a stationary inclined chute to which bottles are delivered neck end downward and down which the bottles slide by gravity, a second chute to which the bottles are delivered by the first mentioned chute, said second chute being oppositely inclined from the first chute so that the bottles when delivered thereon are inclined with their neck ends upward, said conveyer being located beneath the discharge end of the second chute.

3. The combination with a horizontally moving conveyer, of an inclined chute to which bottles are delivered neck end downward and down which the bottles slide by gravity, a second chute to which the bottles are delivered by the first mentioned chute, said second chute being oppositely inclined from the first chute so that the bottles when delivered thereon are inclined with their neck ends upward, said conveyer being located beneath the discharge end of the second chute, said second chute comprising at its lower end a tilting section to assist in turning the bottle from an inclined to an upright position.

4. The combination with a horizontally moving conveyer, of an inclined chute to which bottles are delivered neck end downward and down which the bottles slide by gravity, a second chute to which the bottles are delivered by the first mentioned chute, said second chute being oppositely inclined from the first chute so that the bottles when delivered thereon are inclined with their neck ends upward, said conveyer being located beneath the discharge end of the second chute, and a spring buffer opposite the lower end of the second chute.

5. The combination with a stationary inclined surface to which bottles are delivered *seriatim*, neck end downward, and down which the bottles slide by gravity, of a second surface positioned to receive the bottles from said first surface and inclined reversely to the first surface so that the inclination of the bottles is reversed, and means coöperating with said second surface to place the bottles in an upright position as they slide off the second surface.

6. The combination with a horizontally moving conveyer, of a supporting frame over the conveyer, an inclined chute mounted on said frame above and to one side of the conveyer, a second chute mounted on said frame at the opposite side of the conveyer in position to receive bottles from the first chute and direct them onto the conveyer.

7. The combination with a horizontally moving conveyer, of a supporting frame over the conveyer, an inclined chute mounted on said frame above and to one side of the conveyer, a second chute mounted on said frame at the opposite side of the conveyer in position to receive bottles from the first chute and direct them onto the conveyer, and means to adjust the inclinations of said chutes.

8. The combination of a stationary inclined chute to receive bottles placed thereon neck end downward, and directing means solely by which the bottles are guided to an upright position, the movements of the bottle being effected by the action of gravity on the bottle and the momentum acquired during its movement down said chute.

9. The combination of oppositely inclined chutes arranged in the same vertical plane with their lower ends adjacent to each other and spaced apart horizontally, one of said ends being below the other, and a conveyer beneath said ends and moving transversely to said plane.

10. The combination of a stationary inclined chute, a second oppositely inclined chute opposite the lower end of the first chute and spaced therefrom, in position to receive articles as they slide down and off said first chute and means below said second chute in position to receive articles delivered therefrom.

11. The combination of a stationary inclined chute, a second inclined chute opposite the lower end of the first chute and spaced therefrom, said second chute being positioned to receive articles as they are discharged from the first mentioned chute, and a conveyer beneath the lower end of the second chute and moving transversely thereof, said conveyer positioned to receive said articles as they slide by gravity down and off the second chute.

Signed at Coshocton, in the county of Coshocton, and State of Ohio, this 15th day of February, 1919.

GLENN YOUNG.